United States Patent [19]
Porter

[11] 4,453,616
[45] Jun. 12, 1984

[54] REAR SUSPENSION SYSTEM FOR A MOTOR-TRICYCLE
[75] Inventor: Mark Porter, El Cerrito, Calif.
[73] Assignee: Yamaha Hatsudoki Kabushiki Kaisha, Shizuoka, Japan
[21] Appl. No.: 368,801
[22] Filed: Apr. 19, 1982
[51] Int. Cl.³ .............................................. B62D 61/08
[52] U.S. Cl. .................................... 180/210; 180/215; 180/228; 280/282
[58] Field of Search ............... 180/210, 215, 216, 217, 180/228; 280/282

[56] References Cited
U.S. PATENT DOCUMENTS
4,287,960  9/1981  McConnell .................... 180/217

FOREIGN PATENT DOCUMENTS
519646   3/1955  Italy ............................ 180/215
2035929  6/1980  United Kingdom ............ 180/228

Primary Examiner—Joseph F. Peters, Jr.
Assistant Examiner—Kenneth R. Rice
Attorney, Agent, or Firm—Laff, Whitesel, Conte & Saret

[57] ABSTRACT

A rear suspension system for a motor-tricycle has a frame, a seat and a pair of rear wheels mounted on opposite ends of a rear axle. An integral engine unit includes an engine with a power train connected to the engine, for transmitting the output power of the engine to the rear axle. The rear end of the engine unit supports the rear axle. The engine unit and rear axle assembly is pivotally coupled to the frame via an elastic means, to enable the axle to swing up or down relatively to the frame. Thus, the deformation of the elastic means makes the frame slightly tiltable in the direction perpendicular to its longitudinal axis. A shifting of a rider's weight, while making a turn at a curve, is facilitated, since the frame is made tiltable relatively to the engine unit. Further, since an exhaust silencer or muffler is positioned between rear shock absorbers or cushion units, the safety is improved.

4 Claims, 4 Drawing Figures

REAR SUSPENSION SYSTEM FOR A MOTOR-TRICYCLE

BACKGROUND OF THE INVENTION

1. Field of the Invention

The present invention relates to a rear suspension system for a wheeled vehicle and more particularly to a suspension system for a motor-tricycle having a pair of rear wheels.

2. Description of the Prior Art

In a motor-tricycle having a pair of wheels mounted on opposite ends of a rear axle, the two rear wheels generally run at the same speed, even when making a turn at a curve, because such a tricycle usually has no differential gear. Hence, when turning a curve, it is conventional for a rider to shift his weight far enough so as to cause either one of the rear wheels to either lift off or slip on the surface of a road. For that purpose, the machine should preferably be designed to respond readily to a rider shifting his weight while enabling him to keep a stable riding position particularly when making a turn, as a curve, for example.

However, a conventional rear suspension system used in such a tricycle has hitherto had a swing arm which carries a rear axle at its rear end. The front end of the swing arm, is pivotally coupled to a frame. The arm must be wide enough so that the frame and the swing arm tilt or bank as a single unit, in either the right or the left direction, when viewed in the direction in which the machine runs. To be more specific, the swing arm is enabled to swing up and down relatively to the frame, but is not allowed to tilt or twist freely in the right or left direction, relatively to the frame. As a result, it is difficult for a rider to seize an opportunity for shifting his weight when making a turn, since it is difficult for him to tilt the frame, prior to shifting his weight, relatively to the swing arm. Further, when one of the rear wheels encounters holes or bumps on a road during the turn, the frame may tilt greatly in either the right or the left direction, so that it becomes difficult for the rider to shift his weight and to turn the curve while maintaining a stable riding position.

Furthermore, a hot exhaust silencer or muffler is positioned outside the swing arm in the conventional system, therfore it is possible that the silencer may make contact with either a combustible material on a road surface or a rider's body.

SUMMARY OF THE INVENTION

Therefore, an object of the present invention is to provide a rear suspension system for a motor-tricycle, wherein a frame can be slightly tilted or twisted in either the right or the left direction, independently, with respect to a swing arm.

Another object of the present invention is to provide a rear suspension system for a motor-tricycle, which makes it easy for a rider to seize an opportunity for shifting his weight prior to make a turn at a curve, and to stably shift his weight during the turn.

A further object of the present invention is to provide a rear suspension system for a motor-tricycle, which makes it possible for a rider to make a turn in a stable riding position without being influenced by holes or bumps on a road, which may be encountered by either one of the rear wheels during the turn.

Still a further object of the present invention is to provide a rear suspension system for a motor-tricycle, which can reduce the possibility of bringing a hot muffler or silencer into contact with combustible material or a rider's body.

With the above and other objects in view, the invention provides a rear suspension system for a motor-tricycle having a frame, a seat and a pair of rear wheels mounted on opposite ends of a rear axle. An elongated engine unit includes an engine and a power train integrally connected to the engine for transmitting the output of the engine to the rear axle. The engine unit holds and supports the rear axle at its rear end. The front of the engine unit is pivotally coupled to the frame through an elastic means so that the unit swings up and down relative to the frame. Thus, a deformation of the elastic means makes the frame slightly tiltable in the direction perpendicular to its longitudinal axis.

BRIEF DESCRIPTION OF THE DRAWINGS

The exact nature of this invention, as well as other objects and advantages thereof, will be readily apparent from consideration of the following specification relating to the accompanying drawings, in which like reference characters designates the same or similar parts throughout the figures, and in which.

DESCRIPTION OF THE PREFERRED EMBODIMENTS

Figure 1:
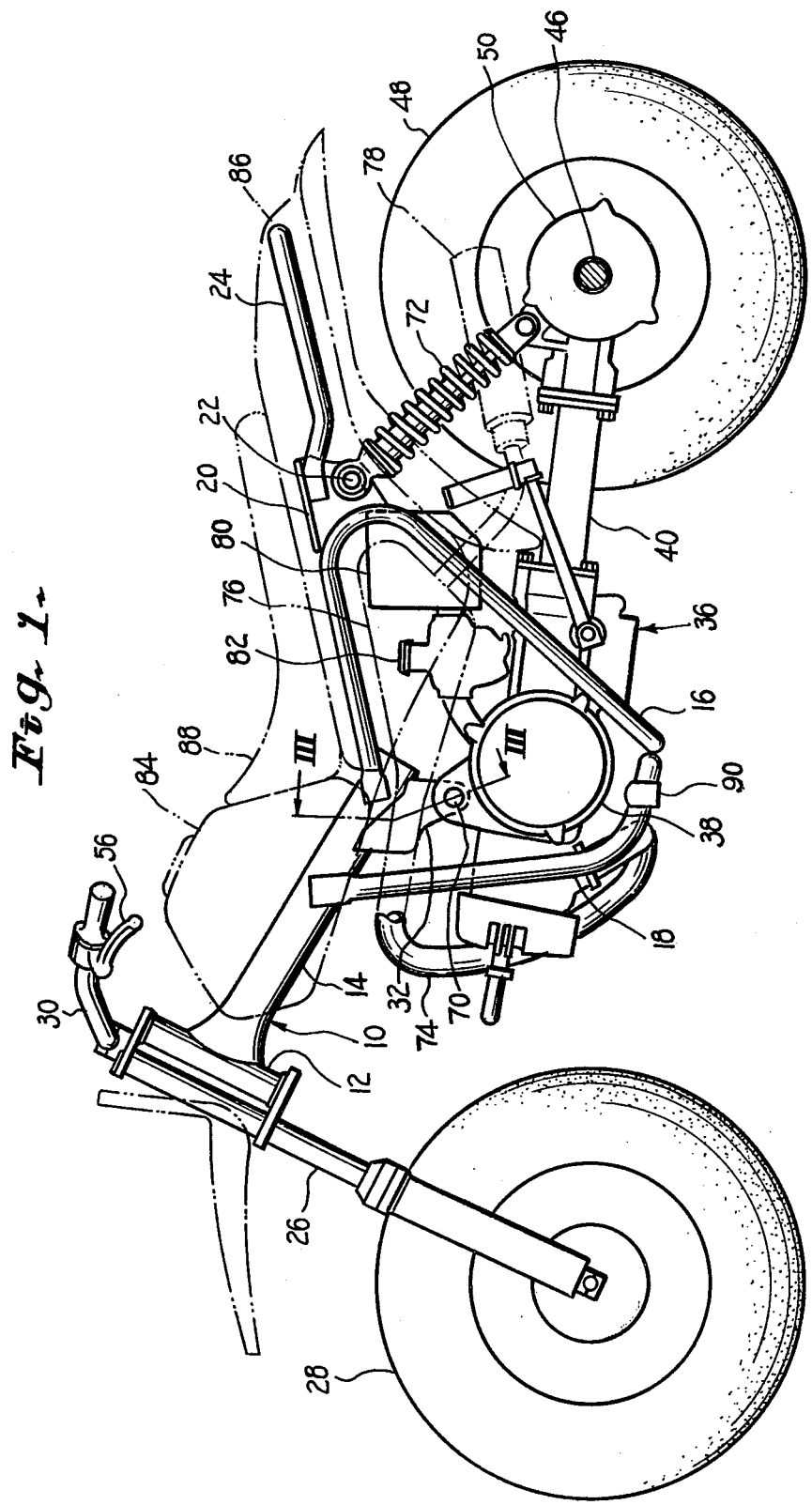
FIG. 1 is a side view showing an embodiment of the present invention.

With reference to FIG. 1, frame 10 comprises a steering head piper 12, a main pipe 14, a pair of seat pillar tubes 16 (16a, 16b) extending rearwardly from the main pipe 14 and thereafter inclining forwardly. A pair of down tubes 18 (18a, 18b) extend from the main pipe 14 downwardly to a point where they are welded to the bottom ends of the seat pillar tubes 16. A pair of brackets 20 (20a, 20b) are welded to the rearmost curved portion of the seat pillar tubes 16 respectively. A cross pipe 22 transversely penetrates and is fixed to the brackets 20. A baskstay 24 protrudes rearwardly from the brackets 20. Reference numeral 26 designates one of a pair of front forks held by the head pipe 12. The second of the pair is not seen in FIG. 1. The front forks 26 include a shock absorber in the form of a well-known telescopic oil bumper with a helical spring therein. At their bottom ends, the front forks 26 carry a front wheel 28 which has an ultra low-pressure tire, of the "balloon" type or "a super-soft" type. At their top ends, forks 26 support a steering handlebar 30. A pair of brackets 32 (32a, 32b) are fixed to the lower surface and next to the bottom end of the main pipe 14. A pipe 34 (FIG. 3) penetrates the brackets 32 and is fixed horizontally therein by a bolt 70.

Reference number 36 identifies an elongated engine unit, which comprises an engine 38 including an automatic centrifugal clutch, a drive shaft case 40 extending rearward from the engine 38, a support arm 42 (FIG. 2), and a bearing case 44 which is fixed to the rear ends of the drive shaft case 40 and the support arm 42. The elongated engine unit 36 is formed by intergrally assembling these components. A transverse rear axle 46 is rotatably supported at the rear end of the engine unit 36. A pair of rear wheels 48 (48a, 48b), including the balloon tires, are fixed at the opposite ends of the axle 46. A drive shaft within the drive shaft case 40, extends through the case and transmits the output power of the engine 38 to the rear axle 46 via bevel gears contained within a gear case 50, which is provided near one end of the bearing case 44. Although a shaft drive mechanism is shown in this embodiment, it is also possible to use a chain drive mechanism or a belt drive mechanism.

Figure 2:
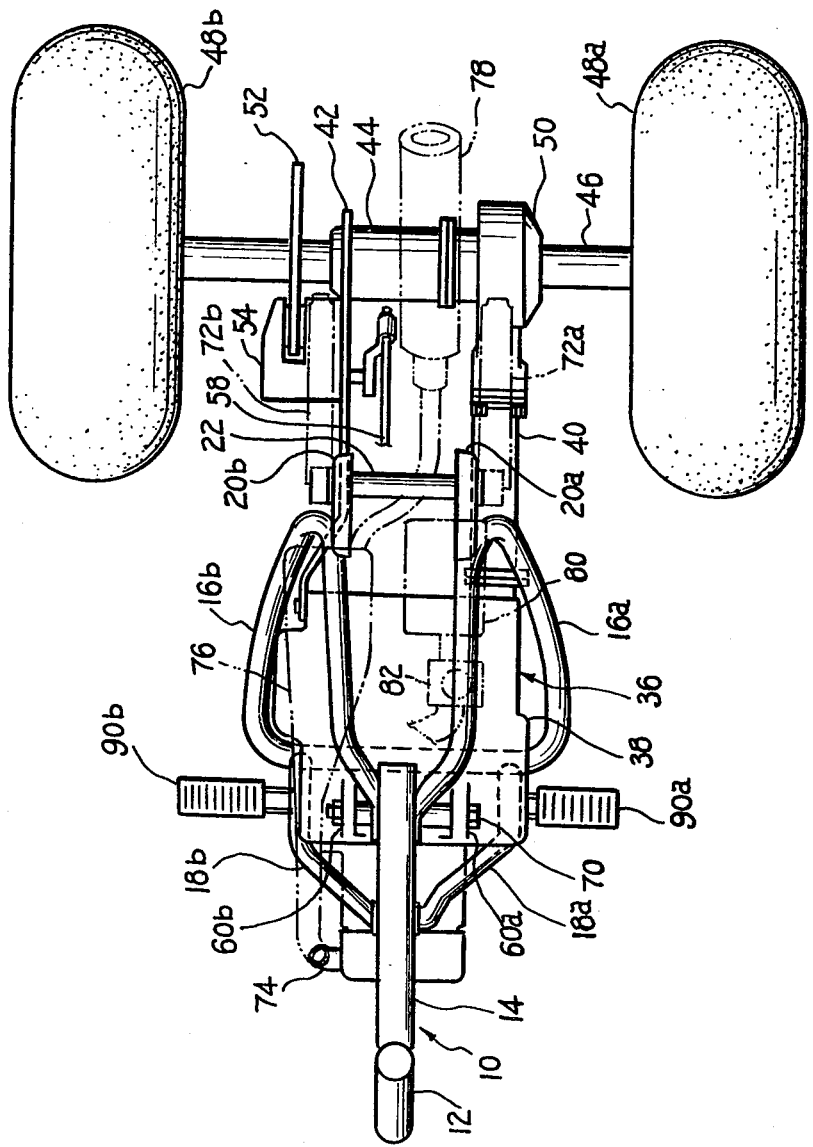
FIG. 2 is a partial plan view of the embodiment shown in FIG. 1.

With reference to FIG. 2, a mechanical disc brake comprises a brake disc 52 fixed to the rear axle 46 with a caliper 54 mounted on the support arm 42. By gripping a brake lever 56 (FIG. 1) pivotally fixed on the handle bar 30, a brake rod 58 is pulled forward. A pair of friction pads housed in the caliper 54 clamps against the opposite sides of brake disc 52, which causes the wheels to slow and stop.

An integral pair of arms 60a, 60b are provided on the top of the engine unit 36. A bolt 70, extending transversely through the arms pivotally couples 60a and 60b, the elongated engine unit 36 to the frame 10. To be more specific, the engine arms 60a and 60b are connected, through an elastic means, to the horizontal pipe 34 (FIG. 3) which penetrates the brackets 32 fixed to the main pipe 14 of the frame 10. As shown in the first embodiment of FIG. 3, the elastic means comprises a pair of rubber rings 66a, 66b which are respectively disposed at opposite ends of pipe 34 and sandwiched between a pair of inner pipes 62a, 62b and a pair of outer pipes 64a, 64b. Collars 68a, 68b rotatably hold the inner pipes 62a, 62b at both ends of the horizontal pipe 34. These collars are fixed in place by a bolt 70, while the outer pipes 64a and 64b are respectively held in a hole in each of the respective engine arms 60a and 60b. As a result, the engine unit 36 is enabled to pivot or swing up and down around the horizontal pipe 34, together with the inner and outer pipes 12a and 62b, 64 and the rubber rings 66a and 66b. Further, by means of the deformation of the rubber rings 66, the frame 10 can be twisted or tilted in either the right or the left direction, when viewed in the direction in which the machine runs on a road.

Reference numeral 72 (FIG. 1) designates one of a pair of oppositely disposed shock absorbing, cushioning units which are coupled, at their upper ends, to the cross pipe 22 penetrating the bracket 20, and are coupled, at their bottom ends, to the bearing case 44 (FIG. 2) of the engine unit 36. An exhaust pipe 74, an expansion box 76 passing through the curved seat pillar tube 16b, a silencer or muffler 78 positioned between the pair of shock absorbing, cushioning units 72 are all connected to and swing with the engine unit 36.

Reference numeral 80 designates an air cleaner positioned inside the seat pillar tube 16a and reference numeral 82 designates a carburetor. The air cleaner 80 and the carburetor 82 are also swingable together with the engine unit 36.

FIG. 1 further shows a fuel tank 84 mounted on the main pipe 14, a rear fender 86 covering the rear wheels 48, a seat 88 mounted on the rear fender 86 and above the engine 38 and, a pair of footrests 90 (90a, 90b) fixed to the down tubes 18.

Next, the operation of the FIGS. 1-3 embodiment will be explained. When the machine is going straight along a road, a rider rests with his weight equally balanced on both footrests 90 and the machine runs with the frame 10 in a upright position. When the machine is running, if either one of the rear wheels 48 swings up or down by hitting holes or bumps on a road, the whole engine unit 36 slightly tilts in the right or left direction in company with the rear axle 46. However, since the engine unit 36 is pivotally coupled to the frame 10 through the rubber rings 66a and 66b which function as an elastic means, the tilting of the engine unit 36 relative to the frame is absorbed by the rubber rings 66a and 66b. Thus the frame 10 is hardly caused to tilt in the right or left direction and the machine can run in a straight and stable position.

At the time of making a turn, the rider's weight is shifted to the outer one of the footrests 90, which is off the turning radius. The total vehicle weight is distributed to the outer wheel, which is on the turning radius. Since the weight is reduced on one wheel, it slips along the road surface. At this time, the frame 10 is tilted in either the right or the left direction relatively to the engine unit 36. Thus, the frame 10 can be easily banked in the desired direction, which can enable the rider to seize an opportunity for shifting the weight. Then, by pushing the seat 88 and the fuel tank 84 by the inner portion of the rider's leg, a sufficient shifting of the weight can be done to move the center of gravity. Even when either one of the rear wheels 48 swings up or down responsive to holes or bumps on a road or when the tilting angle of the engine unit 36 to the frame 10 changes unexpectedly, such impact can be absorbed by the rubber rings 66a and 66b. Therefore, the tilting of the frame 10 is not influenced by the engine unit 36, and thus the machine can stably run along the curve.

Figure 3:
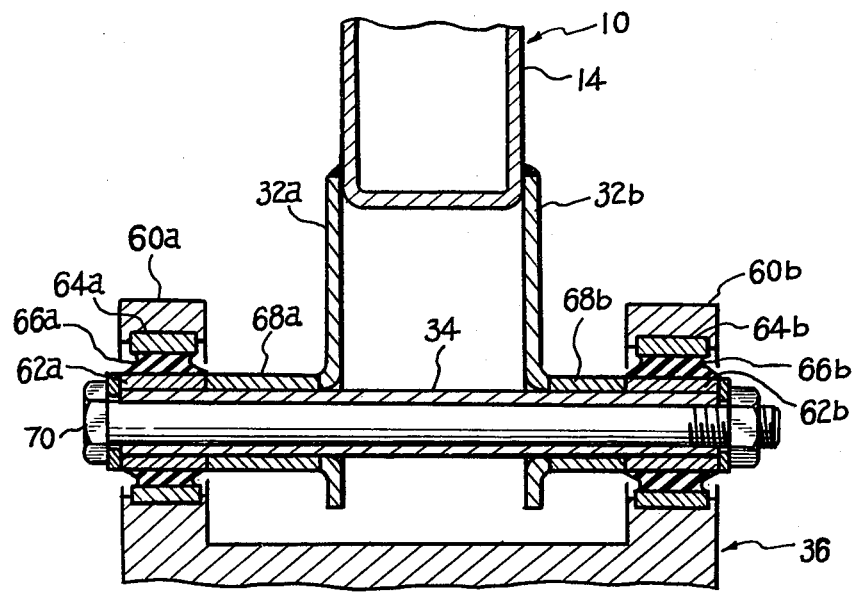
FIG. 3 is a sectional view taken along the lines III—III of FIG. 1.
Figure 4:
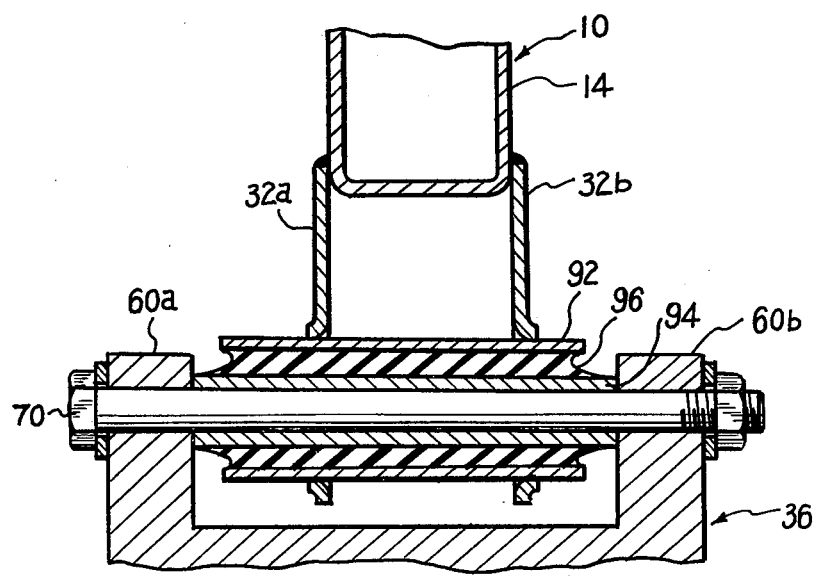
FIG. 4 is similar to FIG. 3 which shows another embodiment of the present invention.

FIG. 4 is similar to FIG. 3, but it shows another embodiment of the invention. Only one outer pipe 92 is fixed to the brackets 32 of the main pipe 14. The bolt 70 holds an inner pipe 94 between the arms 60a, 60b of the engine unit 36. Only one rubber ring (or tube) 96 is sandwiched between the outer and inner pipes 92 and 94.

In the first embodiment shown in FIGS. 1, 2 and 3, the rear wheels 48 use the balloon tires which are highly elastic. Thus, any impact caused by holes or bumps can be considerably absorbed by the balloon tires themselves. Consequently, if either one of the rear wheels 48 encounters holes or bumps, the tilting motion of the engine unit 36 becomes less than when compared with the tilting motion if normal tires are used. For this reason, the tilting motion of the frame 10 is reduced all the more and the running stability is further improved.

When two shock absorbing cushion units are provided as shown in these embodiments, it is possible to obtain sufficient space for positioning the silencer or muffler 78 therebetween. Such an arrangement can reduce the likelihood of a hot muffler silencer contacting combustible material on a road surface or a rider's body, which improves the safety.

Further, when the distance between the arms 60a and 60b of the engine unit 36 is made comparatively short, the tilting motion of the frame 10 becomes still more easy. Also, a rider can sit on the seat 88 more comfortably, since it is not necessary for him to sit with his legs as far apart. Moreover, such an arrangement makes it easy for a rider to put his foot on the ground.

As described above, the engine unit is pivotally coupled to the frame through the elastic means by adopting the unit-swing rear suspension system. The frame is arranged to be slightly titable in either the right or the left direction, relatively to the engine unit. Hence, it becomes easy for a rider to seize an opportunity for shifting his weight at the time of turning a curve, and his weight can be sufficiently shifted at ease.

Furthermore, since the tilting motion of the engine unit caused by holes or bumps on a road can be considerably absorbed by the elastic means, the tilting motion of the frame can be reduced. Thus, it is possible to run the machine in a straight and stable condition or to make a turn, as at a curve.

While the above description discloses preferred embodiments of the present invention, it is to be understood that numerous modifications or alterations may be made without departing from the scope of the invention, as set forth in the following claims.

What is claimed is:

1. A motorized tricycle suspension system comprising a frame with an elongated engine unit mounted therein, a rear axle transversely supported on the rear end of said elongated engine unit, a wheel on each of the opposite ends of said rear axle, elastic means for transversely connecting the front of said elongated engine unit to said frame whereby said frame and engine unit are tiltable relative to each other, said elastic means comprising a first and outer tube affixed to said frame, a second and inner tube affixed to said engine unit, said second tube extending through said first tube, and elastic rubber-like means interposed between said inner and outer tubes to be deformed by relative motion between said tubes.

2. A motorized tricycle suspension system comprising a frame with an elongated engine unit mounted therein, a rear axle transversely supported on the rear end of said elongated engine unit, a wheel on each of the opposite ends of said rear axle, elastic means for transversely connecting the front of said elongated engine unit to said frame whereby said frame and engine unit are tiltable relative to each other, said elastic means comprising first and second tube means in a co-axial relationship with a space therebetween, one of said tube means being affixed to said frame, a second of said tube means being affixed to said engine unit, said elastic means further includes a pair of said rubber-like means interposed between said first and second tube means to be deformed by relative motion between said tubes, one of said pair of rubber-like means being positioned in the space between and at each of the opposite ends of said co-axial tubes.

3. The system of claim 1 wherein said elastic means includes a rubber-like means extending along substantially the entire length of the space between said two tubes.

4. The system of any one of the claims 1, 2 or 3 and a pair of elongated shock absorbing cushioning means extending from near approximately the opposite ends of said rear axle to said frame, and exhaust means extending from said engine unit between said shock absorbing cushioning means to the rear of said frame, whereby a hot exhaust means cannot come into contact with objects adjacent said frame.

* * * * *